United States Patent
Shi

(10) Patent No.: US 11,310,842 B2
(45) Date of Patent: Apr. 19, 2022

(54) METHOD AND APPARATUS FOR NETWORK SELF-ORGANIZATION

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 56 days.

(21) Appl. No.: 16/924,172

(22) Filed: Jul. 8, 2020

(65) Prior Publication Data

US 2020/0344822 A1    Oct. 29, 2020

Related U.S. Application Data

(63) Continuation of application No. PCT/CN2018/071972, filed on Jan. 9, 2018.

(51) Int. Cl.
*H04W 4/00* (2018.01)
*H04W 76/10* (2018.01)
(Continued)

(52) U.S. Cl.
CPC .......... *H04W 76/10* (2018.02); *H04B 17/318* (2015.01); *H04B 7/26* (2013.01);
(Continued)

(58) Field of Classification Search
None
See application file for complete search history.

(56) References Cited

U.S. PATENT DOCUMENTS

| 7,944,899 B2 | 5/2011 | Nordmark et al. |
| 8,693,345 B2 | 4/2014 | Lee et al. |

(Continued)

FOREIGN PATENT DOCUMENTS

| CN | 103415072 | 11/2013 |
| CN | 106341785 | 1/2017 |

(Continued)

OTHER PUBLICATIONS

US 11,249,466 B2, 02/2022, Cella (withdrawn)*
(Continued)

*Primary Examiner* — Bob A Phunkulh
(74) *Attorney, Agent, or Firm* — Hodgson Russ LLP

(57) ABSTRACT

The present application discloses a method and an apparatus for network self-organization. The method comprises: a first node determining a second node of one or more transmission nodes according to a preset condition, the second node being a transmission node having the highest transmission level of the one or more transmission nodes, wherein a higher transmission level of a transmission node indicates fewer hops between the transmission node and an anchor node; and the first node establishing a connection to the second node. Thereby, each transmission node selects an appropriate node from a plurality of nodes on the basis of levels of different nodes and requests to establish a connection, thus realizing establishment of connections between different transmission nodes.

18 Claims, 2 Drawing Sheets

(51) Int. Cl.
*H04B 17/318* (2015.01)
*H04W 36/08* (2009.01)
*H04W 48/20* (2009.01)
*H04W 84/18* (2009.01)
*H04B 7/26* (2006.01)

(52) U.S. Cl.
CPC ............ *H04W 36/08* (2013.01); *H04W 48/20* (2013.01); *H04W 84/18* (2013.01)

(56) References Cited

U.S. PATENT DOCUMENTS

| | | | | |
|---|---|---|---|---|
| 11,250,663 B1* | 2/2022 | Bales | ................ | G07F 17/3225 |
| 2009/0252134 A1 | 10/2009 | Schlicht et al. | | |
| 2011/0164527 A1 | 7/2011 | Mishra et al. | | |
| 2011/0206094 A1* | 8/2011 | Zhang | ................ | H04W 76/12 |
| | | | | 455/7 |
| 2011/0235514 A1* | 9/2011 | Huang | ............... | H04B 7/15528 |
| | | | | 370/235 |
| 2013/0003650 A1* | 1/2013 | Han | ...................... | H04W 28/18 |
| | | | | 370/315 |
| 2016/0192439 A1* | 6/2016 | Phuyal | ..................... | H04L 1/08 |
| | | | | 370/315 |
| 2016/0286471 A1* | 9/2016 | Zisimopoulos | ....... | H04W 8/005 |
| 2016/0337954 A1* | 11/2016 | Gulati | .................. | H04W 76/14 |
| 2017/0208636 A1* | 7/2017 | Agiwal | ................ | H04W 88/04 |
| 2017/0347338 A1* | 11/2017 | Chen | .................. | H04W 72/005 |
| 2017/0359766 A1* | 12/2017 | Agiwal | ................ | H04W 40/12 |
| 2018/0084478 A1* | 3/2018 | Lee | ........................ | H04W 40/12 |
| 2018/0091416 A1* | 3/2018 | Ghosh | ................ | H04W 40/248 |
| 2018/0092017 A1* | 3/2018 | Freda | .................... | H04W 76/23 |
| 2018/0098370 A1* | 4/2018 | Bangolae | .............. | H04W 88/04 |
| 2018/0109990 A1* | 4/2018 | Martin | ................... | H04W 76/14 |
| 2018/0138965 A1* | 5/2018 | Martin | ................... | H04W 48/20 |
| 2018/0139794 A1* | 5/2018 | Chae | ..................... | H04W 56/00 |
| 2018/0234163 A1* | 8/2018 | Yasukawa | .......... | H04B 7/15542 |
| 2018/0332652 A1* | 11/2018 | Kim | ..................... | H04W 88/02 |
| 2019/0182140 A1* | 6/2019 | Tenny | ................... | H04W 48/20 |
| 2019/0215055 A1* | 7/2019 | Majmundar | ....... | H04B 7/15521 |
| 2019/0320017 A1* | 10/2019 | Li | ........................ | H04L 67/1065 |
| 2020/0100207 A1* | 3/2020 | Liu | ..................... | H04W 68/005 |
| 2022/0030514 A1* | 1/2022 | Wu | ..................... | H04W 40/12 |
| 2022/0046485 A1* | 2/2022 | Hong | ................... | H04W 76/27 |

FOREIGN PATENT DOCUMENTS

| | | |
|---|---|---|
| EP | 2237614 | 10/2010 |
| WO | 2015186077 | 12/2015 |

OTHER PUBLICATIONS

EPO, Communication for EP Application No. 18899357.0, dated May 6, 2021.
EPO, EESR for EP Application No. 18899357.0, dated Sep. 18, 2020.
WIPO, ISR for PCT/CN2018/071972, dated Jun. 28, 2018.

* cited by examiner

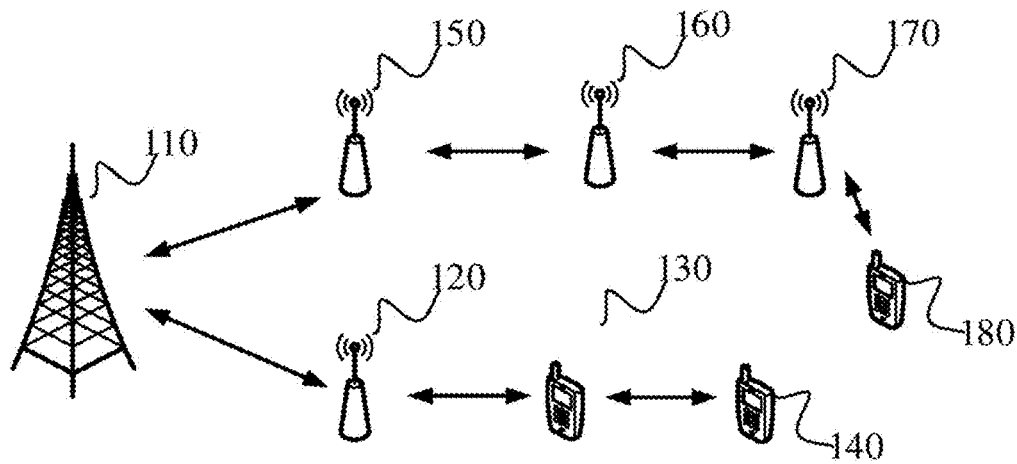

A FIRST NODE DETERMINES A SECOND NODE OF ONE OR MORE TRANSMISSION NODES ACCORDING TO A PRESET CONDITION, THE SECOND NODE BEING A TRANSMISSION NODE HAVING THE HIGHEST TRANSMISSION LEVEL OF THE ONE OR MORE TRANSMISSION NODES — 210

THE FIRST NODE ESTABLISHES A CONNECTION TO THE SECOND NODE — 220

The second node receives a connection establishment request message sent by the first node — 310

The second node determines whether to establish a connection with the first node based on the level of the second node according to the connection establishment request message — 320

Fig.3

METHOD AND APPARATUS FOR NETWORK SELF-ORGANIZATION

CROSS-REFERENCE TO RELATED APPLICATION

This application is a continuation of International Application No. PCT/CN2018/071972, filed Jan. 9, 2018, the entire disclosure of which is incorporated herein by reference.

TECHNICAL FIELD

The present disclosure relates to the field of communication and, more particularly, to a method and device for network self-organization.

BACKGROUND

In a 5G system or a New Radio (NR) system, wireless relay can be used for data transmission. Therefore, how to establish a relay connection between different nodes has become an urgent problem.

SUMMARY

The embodiments of the present application provide a method and a device for network self-organization, which can establish a connection between different nodes.

According to a first aspect, a data transmission method is provided, including: determining, by a first node, a second node among at least one transmission node according to a preset condition, wherein the second node is a transmission node with a highest level among the at least one transmission node, and wherein a higher level of the transmission node indicates fewer hops between the transmission node and an anchor node; and establishing, by the first node, a connection with the second node.

Therefore, each transmission node selects a suitable node based on the levels of different nodes and requests to establish a connection, thereby achieving the establishment of the connection between different transmission nodes.

In a possible implementation manner, before determining, by the first node, the second node among the at least one transmission node according to the preset condition, the method further includes: performing, by the first node, a signal measurement, and determining a transmission node whose measurement result is higher than a preset threshold as the at least one transmission node.

In a possible implementation manner, the measurement result is a measurement result of a reference signal receiving power (RSRP), and/or a reference signal receiving quality (RSRQ).

In a possible implementation manner, the preset threshold is a reference signal receiving power threshold during a cell selection or reselection, and/or, a reference signal receiving quality threshold during the cell selection or reselection.

In a possible implementation manner, before determining, by the first node, the second node among the at least one transmission node according to the preset condition, the method further includes: receiving, by the first node, configuration information, wherein the configuration information is used to indicate the preset threshold.

In a possible implementation manner, before determining, by the first node, the second node among the at least one transmission node according to the preset condition, the method further includes: acquiring, by the first node, the preset threshold pre-stored in the first node.

In a possible implementation manner, the establishing, by the first node, the connection with the second node includes: when a level of the second node does not reach a lowest level, establishing, by the first node, a connection with the second nod based on a Uu interface, wherein the lowest level is a lowest level that can be represented by an information field for representing the level of each node.

In a possible implementation manner, the method further includes: broadcasting, by the first node, a level of the first node.

In a possible implementation manner, when a level of the second node does not reach a lowest level, the level of the first node is lower than the level of the second node, wherein the lowest level is a lowest level that can be represented by an information field for representing the level of each node.

In a possible implementation manner, when a level of the second node has reached a lowest level, the level of the second node is updated to a highest level, and the level of the first node is lower than the updated level of the second node, and wherein the lowest level is a lowest level that can be represented by an information field for representing the level of each node, and the highest level is a highest level that can be represented by the information field.

In a possible implementation manner, when a level of the second node has reached a lowest level, the level of the first node is a highest level, and wherein the lowest level is a lowest level that can be represented by an information field for representing the level of each node, and the highest level is a highest level that can be represented by the information field.

In a possible implementation manner, the establishing, by the first node, the connection with the second node includes: establishing, by the first node, the connection with the second node through a Uu interface.

In a possible implementation manner, when a level of the second node has reached a lowest level, the level of the first node is the lowest level, and wherein the lowest level is a lowest level that can be represented by an information field for representing the level of each node.

In a possible implementation manner, the establishing, by the first node, the connection with the second node includes: establishing, by the first node, the connection with the second node in a device-to-device (D2D) manner.

In a possible implementation manner, the method further includes: establishing, by the first node, a connection with at least one other transmission node that has the same level as the first node in a D2D manner.

In a possible implementation manner, the method further includes: establishing, by the first node, a connection with at least one other transmission node that has the same level as the first node based on a Uu interface.

In a possible implementation manner, the first node receives first configuration information sent by the second node, wherein the first configuration information is used to instruct the first node to establish the connection with the at least one other transmission node that has the same level as the first node based on the Uu interface.

In a possible implementation manner, the method further includes: establishing, by the first node, a connection with at least one other transmission node that has the same level as the second node based on a Uu interface.

In a possible implementation manner, the method further includes: receiving, by the first node, second configuration information sent by the second node, wherein the second configuration information is used to instruct the first node to establish the connection with the at least one other transmission node that has the same level as the second node based on the Uu interface.

In a possible implementation manner, the method further includes: disconnecting, by the first node, an established connection with other transmission node.

In a possible implementation manner, the method further includes: maintaining, by the first node, an established connection with other transmission node.

In a possible implementation manner, when the at least one transmission node further comprises N transmission nodes of the same level as the second node, the method further includes: performing, by the first node, a signal measurement, and determining the second node among the N transmission nodes according to a measurement result, wherein the second node is a transmission node with the highest signal measurement result among the N transmission nodes.

In a second aspect, a data transmission method is provided, including: receiving, by a second node, a connection establishment request message sent by a first node; and determining, by the second node, whether to establish a connection with the first node based on a level of the second node according to the connection establishment request message, wherein a higher level of a transmission node indicates fewer hops between the transmission node and an anchor node.

Therefore, each node determines whether to establish a connection with other node according to its own level, thereby achieving the establishment of the connection between different transmission nodes.

In a possible implementation manner, the determining, by the second node, whether to establish the connection with the first node based on the level of the second node according to the connection establishment request message, includes: when the level of the second node has reached a lowest level, determining, by the second node, to refuse to establish a connection with the first node based on a Uu interface, wherein the lowest level is a lowest level that can be represented by an information field for representing each node.

In a possible implementation manner, the determining, by the second node, whether to establish the connection with the first node based on the level of the second node according to the connection establishment request message, includes: when the level of the second node does not reach a lowest level, determining, by the second node, to establish a connection with the first node, wherein a level of the first node is lower than the level of the second node, and the lowest level is a lowest level that can be represented by an information field for representing each node.

In a possible implementation manner, the determining, by the second node, whether to establish the connection with the first node based on the level of the second node according to the connection establishment request message, includes: when the level of the second node has reached a lowest level, updating, by the second node, the level of the second node to a highest level, and determining to establish a connection with the first node, wherein the level of the first node is lower than the updated level of the second node, the lowest level is a lowest level that can be represented by an information field for representing each node, and the highest level is a highest level that can be represented by the information field.

In a possible implementation manner, the determining, by the second node, whether to establish the connection with the first node based on the level of the second node according to the connection establishment request message, includes: when the level of the second node has reached a lowest level, determining, by the second node, to establish a connection with the first node, wherein a level of the first node is a highest level, and the lowest level is a lowest level that can be represented by an information field for representing the level of each node, and the highest level is a highest level that can be represented by the information field.

In a possible implementation manner, the method further includes: establishing, by the second node, a connection with the first node through a Uu interface.

In a possible implementation manner, the determining, by the second node, whether to establish the connection with the first node based on the level of the second node according to the connection establishment request message, includes: when the level of the second node has reached a lowest level, determining, by the second node, to establish a connection with the first node in a device-to-device (D2D) manner, wherein a level of the first node is the lowest level, and the lowest level is a lowest level that can be represented by an information field for representing the level of each node.

In a possible implementation manner, the method further includes: broadcasting, by the second node, a level of the second node.

In a possible implementation manner, the method further includes: sending, by the second node, first configuration information to the first node, wherein the first configuration information is used to instruct the first node to establish the connection with the at least one other transmission node that has the same level as the first node based on the Uu interface.

In a possible implementation manner, the method further includes: sending, by the second node, second configuration information to the first node, wherein the second configuration information is used to instruct the first node to establish the connection with the at least one other transmission node that has the same level as the second node based on the Uu interface.

According to a third aspect, a transmission node is provided, and the transmission node may perform the operations of the first node in the first aspect or any optional implementation manner of the first aspect. Specifically, the transmission node may include a module unit for performing the operations of the first node in the foregoing first aspect or any possible implementation manner of the first aspect.

According to a fourth aspect, a transmission node is provided, and the transmission node may perform the operations of the second node in the foregoing second aspect or any optional implementation manner of the second aspect. Specifically, the transmission node may include a module unit for performing the operations of the second node in the foregoing second aspect or any possible implementation manner of the second aspect.

According to a fifth aspect, a transmission node is provided. The transmission node includes: a processor, a transceiver, and a memory. The processor, the transceiver, and the memory communicate with each other through an internal connection path. The memory is used to store instructions, and the processor is used to execute the instructions stored in the memory. When the processor executes the instructions stored in the memory, the execution causes the transmission node to execute the method in the first aspect or any possible implementation manner of the first aspect, or the execution causes the transmission node to implement the first node provided by the third aspect.

According to a sixth aspect, a transmission node is provided. The transmission node includes: a processor, a transceiver, and a memory. The processor, the transceiver, and the memory communicate with each other through an internal connection path. The memory is used to store instructions, and the processor is used to execute the instructions stored in the memory. When the processor executes the instructions stored in the memory, the execution causes the transmission node to execute the method in the second aspect or any possible implementation manner of the second aspect, or the execution causes the transmission node to implement the second node provided by the fourth aspect.

According to a seventh aspect, a system chip is provided. The system chip includes an input interface, an output interface, a processor, and a memory. The processor is configured to execute an instruction stored in the memory. When the instruction is executed, the processor may implement the foregoing method in the first aspect or any possible implementation of the first aspect.

According to an eighth aspect, a system chip is provided. The system chip includes an input interface, an output interface, a processor, and a memory. The processor is configured to execute an instruction stored in the memory. When the instruction is executed, the processor may implement the foregoing method in the second aspect or any possible implementation of the second aspect.

According to a ninth aspect, a computer program product including instructions is provided. When the computer program product is run on a computer, the computer is caused to execute the method in the foregoing first aspect or any possible implementation manner of the first aspect.

According to a tenth aspect, a computer program product including instructions is provided. When the computer program product is run on a computer, the computer is caused to execute the method in the foregoing second aspect or any possible implementation manner of the second aspect.

BRIEF DESCRIPTION OF THE DRAWINGS

FIG. 1 is a schematic diagram of a wireless communication system according to an embodiment of the present application.

FIG. 2 is a schematic flowchart of a network self-organizing method according to an embodiment of the present application.

FIG. 3 is a schematic flowchart of a network self-organizing method according to another embodiment of the present application.

DETAILED DESCRIPTION

Figure 4:
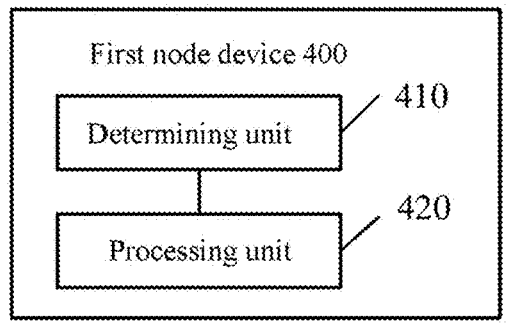
FIG. 4 is a schematic block diagram of a node device according to an embodiment of the present disclosure.

The technical solutions in the embodiments of the present application will be described below with reference to the drawings.

It should be understood that the technical solutions in the embodiments of the present application can be applied to various communication systems, for example, a Global System of Mobile Communication (GSM) system, a Code Division Multiple Access (CDMA) system, a Wideband Code Division Multiple Access (WCDMA) system, a Long Term Evolution (LTE) system, a LTE Frequency Division Duplex (FDD) system, LTE Time Division Duplex (TDD), a Universal Mobile Telecommunication System (UMTS), and future 5G communication systems.

The present application describes various embodiments in conjunction with a terminal device. The terminal device may also refer to User Equipment (UE), an access terminal, a user unit, a user station, a mobile station, a mobile platform, a remote station, a remote terminal, a mobile device, a user terminal, a terminal, a wireless communication device, a user agent or a user apparatus. The access terminal may be a cell phone, a cordless phone, a Session Initiation Protocol (SIP) phone, a Wireless Local Loop (WLL) station, a Personal Digital Assistant (PDA), a handheld device and a computing device having a wireless communication function, or other processing devices connected to a wireless modem, an in-vehicle device, a wearable device, a terminal device in the future 5G network, or a terminal device in future evolved Public Land Mobile Network (PLMN) network, etc.

The present application describes various embodiments in conjunction with a network device. The network device may be a device for communicating with the terminal device. For example, it may be a base station (Base Transceiver Station, BTS) in the GSM system or CDMA, or a base station (NodeB, NB) in the WCDMA system, or it may be an evolutionary base station (Evolutionary Node B, eNB, or eNodeB) in the LTE system, or the network device may be a relay station, an access point, an in-vehicle device, a wearable device, and a network-side device in a future 5G network or a network-side device in a future evolved PLMN network, etc.

In the NR system, wireless relay can be used for data transmission, and connections between different transmission nodes can be established to form a topology network (Mesh). The data of one relay node can be transmitted to an anchor node through a plurality of lines and delivered by the anchor node to a core network.

For example, FIG. 1 shows a wireless communication system 100 to which the embodiments of the present application are applied. The wireless communication system 100 includes a plurality of transmission nodes. The plurality of transmission nodes may include one anchor node 110. The anchor node 110 may be connected to the core network by a wired connection. The wireless communication system 100 further includes a plurality of relay nodes, such as a relay node 120 to a relay node 180. The relay node 120 and the anchor node 110 may be connected in a wireless manner, and data transmission from one node to another node may go through one hop or multiple hops. The transmission node may be a network device or a terminal device. In FIG. 1, it can be considered that in two connected relay nodes 120, one relay node with fewer hops to the anchor node 110 is a parent node of the other relay node with more hops to the anchor node 110. Similarly, the relay node with more hops to the anchor node 110 is a child node of the relay node with fewer hops to the anchor node 110.

In the network self-organization process, in order to form the topology network, each transmission node needs to establish a connection with other nodes. In the embodiment of the present application, each transmission node selects a suitable node based on the level of different nodes and requests to establish a connection, thereby achieving the establishment of a connection between different transmission nodes.

The network in the embodiments of the present application may refer to a Public Land Mobile Network (PLMN) or a Device to Device (D2D) network or a Machine to Machine/Man (M2M) network, or other networks.

The transmission node (also simply referred to as a relay node or a node) in the embodiments of the present application may be a network device such as a core network device or an access network device, or a terminal device such as a vehicle terminal or a handheld terminal.

FIG. 2 is a schematic flowchart of a network self-organizing method according to an embodiment of the present application. The method shown in FIG. 1 may be executed by a first node, and the first node may be a network device or a terminal device. The first node is, for example, any transmission node in FIG. 1. As shown in FIG. 2, the network self-organizing method includes the following steps.

In 210, the first node determines a second node among at least one transmission node according to a preset condition, the second node being a transmission node with the highest level among the at least one transmission node.

The higher the level of the transmission node is, the less the number of hops between the transmission node and the anchor node is.

In 220, a connection is established between the first node and the second node.

Specifically, the first node determines the at least one transmission node according to a preset condition, and selects the transmission node with the highest level among the at least one transmission node as a second node to be connected, thereby establishing a wireless connection with the second node.

Optionally, the establishing a connection between the first node and the second node includes: if the level of the second node does not reach the lowest level, establishing a Uu interface-based connection between the first node and the second node.

In other words, if the level of the second node is the lowest level, the first node will not initiate a Uu interface-based connection establishment with the second node. However, the possibility that the first node establishes a connection with the second node through other methods such as D2D is not excluded.

Optionally, the level information of any transmission node may be represented by an information field.

For example, the information field is composed of 8 bits, and then a total of 256 levels can be represented. It is assumed that a smaller value in the information field indicates a higher level of the transmission node, that is, a smaller number of hops relative to the anchor node. Then, if the value in the information field is 0, it can indicate that the number of hops of the transmission node relative to the anchor node is 1, that is, a direct wireless connection is between the transmission node and the anchor node; and if the value in the information field is 255, it can indicate that the number of hops of the transmission node relative to the anchor node is 256. Alternatively, if the value in the information field is 0, it may indicate that the transmission node is an anchor node; and if the value in the information field is 255, it may indicate that the number of hops of the transmission node relative to the anchor node is 255.

The anchor node in the embodiments of the present application may also be referred to as a donor node. For example, the anchor node is a node that is directly connected to the core network in a wired manner.

Optionally, before 210, the method further includes: the first node performing a signal measurement, and determining a transmission node whose measurement result is higher than a preset threshold as the at least one transmission node.

For example, the first node may measure the receiving power and/or receiving quality of reference signals of some transmission nodes, thereby obtaining corresponding measurement results, namely, Reference Signal Receiving Power (RSRP) and/or Reference Signal Receiving Quality (RSRQ), and using the transmission node whose measurement result is higher than the preset threshold as the candidate at least one transmission node.

The first node may receive configuration information indicating the preset threshold; or, the preset threshold is predetermined in advance between the first node and the network device, for example, as stipulated in an agreement, then the first node may obtain the preset threshold pre-stored in the first node.

Optionally, the preset threshold may be a reference signal receiving power threshold in a cell selection or reselection process, and/or a reference signal receiving quality threshold in the cell selection or reselection process.

For example, when the obtained measurement result is RSRP, the first node may regard a transmission node whose RSRP measurement result is higher than the reference signal receiving power threshold as the candidate at least one transmission node, and select a transmission node with the highest level among the at least one transmission node to initiate a connection.

For another example, when the obtained measurement result is RSRQ, the first node may use the transmission node whose RSRQ measurement result is higher than the reference signal receiving quality threshold as the candidate at least one transmission node, and select a transmission node with the highest level among the at least one transmission node to initiate a connection.

For another example, when the obtained measurement results include both the RSRP and RSRQ of each node, in the candidate at least one transmission node, the RSRP of each node is higher than the reference signal receiving power threshold, and the RSRQ of each node is higher than the reference signal receiving quality threshold.

The signal receiving power in the cell selection process can be expressed as:

$$S_{rxlev} = Q_{rxlevmeas} - (Q_{rxlevmin} + Q_{rxlevminoffset}) - P_{compensation};$$

Among them, $S_{rxlev} > 0$. $Q_{rxlevmeas}$ is the reference signal receiving power RSRP of the candidate cell; $Q_{rxlevmin}$ and $Q_{rxlevminoffset}$ are the minimum receiving levels for cell camping configured in the System Information Block (SIB), $Q_{rxlevminoffset}$ is used only when the first node camps on a Virtual Public Land Mobile Network (VPLMN) cell; $P_{compensation} = \text{Max}(P_{EMAX} - P_{UMAX}, 0)$, $P_{EMAX}$ is the maximum uplink transmission power that can be used by the first node, and $P_{UMAX}$ is the maximum radio frequency (RF) output power of the first node, and units of $P_{EMAX}$ and $P_{UMAX}$ are both dB.

The signal receiving quality in the cell selection process can be expressed as:

$$S_{qual} = Q_{qualmeas} - (Q_{qualmin} - Q_{qualminoffset}) - P_{compensation};$$

Among them, $S_{qual} > 0$. $Q_{qualmeas}$ is the reference signal receiving quality (RSRQ) of the candidate cell; $Q_{qualmin}$ and $Q_{qualminoffset}$ are the minimum receiving quality values of the cell camping, and $Q_{rxlevminoffset}$ is used only when the first node is camping in the VPLMN cell; $P_{EMAX}$ is the maximum uplink transmission power that can be used by the first node, $P_{UMAX}$ is the maximum RF output power of the first node, and units of $P_{EMAX}$ and $P_{UMAX}$ are both dB.

Therefore, the reference signal receiving power threshold can be expressed as $Q_{rxlevmeas}=S_{rxlev}+(Q_{rxlevmin}+Q_{rxlevminoffset})+P_{compensation}$, that is, the reference signal receiving power threshold can include multiple components; and the reference signal receiving quality threshold can be expressed as $S_{qual}=Q_{qualmeas}-(Q_{qualmin}+Q_{qualminoffset})-P_{compensation}$, that is, the reference signal receiving quality threshold may include multiple components.

Optionally, after the first node selects the second node, it also needs to determine its own level and broadcast its own level, so that other nodes can learn the level information of the first node.

The first node determines the level of the first node based on the level of the second node.

The second node may broadcast its own level information, and the first node may determine the level information of the second node by using a value on the foregoing information field of the second node. There are the following three situations.

First Situation

If the level of the second node does not reach the lowest level, the level of the first node is lower than the level of the second node, for example, the level of the first node is one level lower than the level of the second node.

The lowest level is the lowest level that can be represented by the information field for representing the level of each node. For example, when the information field includes 8 bits, the value of the lowest level may be 255, for example, it may indicate that the number of hops of the node relative to the anchor node is 256.

For example, it is assumed that the information field has 8 bits. If the value on the information field broadcasted by the second node is 4 (for example, the number of hops of the second node relative to the anchor node can be considered to be 5), then the level information of the first node can be determined as 5 (for example, it may be considered that the number of hops of the first node relative to the anchor node is 6). After that, the first node can broadcast the information of the level determined by the first node.

Second Situation

If the level of the second node has reached the lowest level, the level of the second node is updated to the highest level, and the level of the first node is lower than the level of the updated second node.

The lowest level is the lowest level that can be represented by an information field for representing the level of each node, and the highest level is the highest level that can be represented by the information field. For example, when the information field includes 8 bits, the value of the lowest level can be 255, which can indicate that the number of hops of the node relative to the anchor node is 256; and the value of the highest level can be 0, which can indicate that the number of hops of the node relative to the anchor node is 1.

For example, it is assumed that the information field has 8 bits. If the value represented by the information field broadcasted by the second node has reached the maximum value of 255, that is, the level of the second node represented by the information field is the lowest level that can be represented (for example, it may be considered that the number of hops of the second node relative to the anchor node is 256), then, the value in the information field of the second node can be updated to 0 again, that is, the level of the second node is updated to the highest level (for example, it may be considered that the number of hops of the second node relative to the anchor node is 1), so that the level of the first node can be 1 (for example, the number of hops of the first node relative to the anchor node can be considered to be 2). After that, the first node can broadcast the information of the level determined by the first node.

Third Situation

If the level of the second node has reached the lowest level, the level of the first node is the highest level.

The lowest level is the lowest level that can be represented by an information field for representing the level of each node, and the highest level is the highest level that can be represented by the information field. For example, when the information field includes 8 bits, the value of the lowest level can be 255, which can indicate that the number of hops of the node relative to the anchor node is 256; and the value of the highest level can be 0, which can indicate that the number of hops of the node relative to the anchor node is 1.

For example, it is assumed that the information field has 8 bits. If the value represented by the information field broadcasted by the second node has reached the maximum value of 256, that is, the level of the second node represented by the information field is the lowest level that can be represented (for example, the number of hops of the second node relative to the anchor node may be considered to be 256), then the level information of the first node may be determined as 0 (for example, the number of hops of the first node relative to the anchor node may be considered to be 1). After that, the first node may broadcast the information of the level determined by the first node.

Fourth Situation

If the level of the second node has reached the lowest level, the level of the first node is the lowest level.

The lowest level is the lowest level that can be represented by the information field for representing the level of each node. For example, when the information field includes 8 bits, the value of the lowest level may be 255, for example, it may indicate that the number of hops of the node relative to the anchor node is 256.

For example, it is assumed that the information field has 8 bits. If the value represented by the information field broadcasted by the second node has reached the maximum value of 255, that is, the level of the second node represented by the information field is the lowest level that can be represented (for example, the number of hops of the second node relative to the anchor node may be considered to be 256), then the first node can directly determine its level as the lowest level, that is, the value on the information field of the first node is 0 (for example, it can be considered that the number of hops of the first node relative to the anchor node is 1). After that, the first node can broadcast the information of the level determined by the first node. At this time, the level of the first node is equal to the level of the second node, and both are the lowest level.

In the first situation, second situation and third situation, the first node may establish a connection with the second node through a Uu interface, and at this time, the level of the first node is lower than the level of the second node. The first node can be regarded as a child node of the second node, and the second node is a parent node of the first node.

In the fourth situation, the first node may establish a connection with the second node in a device-to-device (D2D) manner. At this time, the level of the first node is equal to the level of the second node.

Optionally, the first node may also establish a connection in a D2D manner with other node at the same level as the first node. The other node here may be one transmission node or a plurality of transmission nodes.

Alternatively, optionally, the first node may establish a Uu interface-based connection with other node at the same level as the first node. The other node here may be one transmission node or a plurality of transmission nodes.

Optionally, the method further includes: the first node receiving first configuration information sent by the second node, where the first configuration information is used to indicate the first node to establish a Uu interface-based connection with other at least one transmission node having the same level as the first node. Therefore, based on the first configuration information of the second node, the first node establishes a Uu interface-based connection with other nodes at the same level as the first node.

In this embodiment, optionally, when a Uu interface-based connection is established between the first node and other nodes at the same level as the first node, the connection may be established based on the priority.

For example, the first node has the same level as the third node, and the first node has a lower priority than the third node. The lower priority of the first node is because the boot time of the third node is earlier than that of the first node, or the boot time of the first node is later than the boot time of the third node, and the third node has already established a relay connection with the anchor node prior to the first node. Alternatively, the lower priority of the first node is because the priority is pre-configured inside the node. When a connection is established through the Uu interface, the first node with a lower priority may be assumed to be a user equipment (UE) side, so as to establish a connection with the third node.

The connection established between the first node and the third node based on the Uu interface may be established based on the network configuration. For example, the second node sends first configuration information to the first node to configure the first node to be assumed as a user equipment (UE) side, and establish a connection with the third node; or configure the first node to be assumed as a base station (gNB) side, and establish a connection with the third node.

Optionally, the method further includes: establishing a Uu interface-based connection between the first node and at least one other transmission node of the same level as the second node.

Optionally, the method further includes: the first node receiving second configuration information sent by the second node, where the second configuration information is used to indicate the first node to establish a connection based on the Uu interface with at least one other transmission node at the same level as the second node. According to the second configuration information of the second node, the first node establishes a Uu interface-based connection with at least one other transmission node of the same level as the second node.

Optionally, the first node may establish a connection with a plurality of transmission nodes at the same level as the second node through the foregoing steps.

After the first node establishes a connection with the second node in 220, for example, through the Uu interface, the first node may disconnect the established connection with other transmission nodes, or may continue to maintain the connection with other transmission nodes.

Optionally, if the at least one transmission node further includes N transmission nodes at the same level as the second node, the method further includes: performing a signal measurement by the first node, and according to the measurement result, determining the second node among the N transmission nodes, where the second node is a transmission node with the highest signal measurement result among the N transmission nodes, and N is a positive integer greater than 1.

For example, the first node uses the transmission node with the highest RSRP measurement result among the N transmission nodes as the second node, or the first node uses the transmission node with the highest RSRQ measurement result among the N transmission nodes as the second node.

Therefore, in the embodiments of the present application, each transmission node selects an appropriate node based on the levels of different nodes and requests establishment of a connection, thereby achieving establishment of a connection between different transmission nodes.

FIG. 3 is a schematic flowchart of a network self-organizing method according to an embodiment of the present application. The method shown in FIG. 3 may be executed by a second node, and the second node may be a network device or a terminal device. The second node is, for example, any transmission node in FIG. 1. As shown in FIG. 3, the network self-organizing method includes the following steps.

In 310, the second node receives a connection establishment request message sent by the first node.

In 320, the second node determines whether to establish a connection with the first node based on the level of the second node according to the connection establishment request message.

The higher the level of the transmission node, the less the number of hops between the transmission node and an anchor node.

Optionally, the level information of the second node may be represented by an information field.

For example, the information field is composed of 8 bits, and then a total of 256 levels can be represented. It is assumed that a smaller value in the information field indicates a higher level of the transmission node, that is, a smaller number of hops relative to the anchor node. Then, if the value in the information field is 0, it can indicate that the number of hops of the second node relative to the anchor node is 1. If the value in the information field is 255, it can indicate that the number of hops of the second node relative to the anchor node is 256. Alternatively, if the value in the information field is 0, it may indicate that the transmission node is the anchor node; and if the value in the information field is 255, it may indicate that the number of hops of the transmission node relative to the anchor node is 255.

Optionally, if the level of the second node has reached the lowest level, the second node determines to refuse to establish a Uu interface-based connection with the first node. In other words, when the level of the second node has reached the lowest level, it may no longer accept other nodes' connections based on the Uu interface. However, the possibility of establishing a connection between the second node and other nodes through other methods such as D2D is not excluded.

Optionally, if the level of the second node does not reach the lowest level, the second node determines to establish a connection with the first node. At this time, the level of the first node is lower than the level of the second node. The second node may establish a relay connection with the first node through a Uu interface.

Optionally, if the level of the second node has reached the lowest level, the second node updates the level of the second node to the highest level, and determines to establish a connection with the first node. At this time, the level of the first node is lower than the level of the updated second node.

The second node may establish a relay connection with the first node through a Uu interface.

Optionally, if the level of the second node has reached the lowest level, the second node determines to establish a connection with the first node. At this time, the level of the first node is the highest level. The lowest level is the lowest level that can be represented by an information field for representing the level of each node, and the highest level is the highest level that can be represented by the information field.

Optionally, if the level of the second node has reached the lowest level, the second node may determine to establish a connection with the first node in a device-to-device D2D manner. At this time, the level of the first node is the same as the level of the second node, and both are the lowest level.

The lowest level described above is the lowest level that can be represented by the information field for representing each node. The above-mentioned highest level is the highest level that can be represented by the information field for representing each node. For example, when the information field includes 8 bits, the value of the lowest level may be 255, for example, it may indicate that the number of hops of the node relative to the anchor node is 256; and the value of the highest level may be 0, for example, it may indicate that the number of hops of the node relative to the anchor node is 1.

After establishing a connection with the first node, the second node may broadcast the level of the second node so that other nodes can learn the level information of the second node.

Therefore, each node determines whether to establish a connection with other nodes according to its own level, thereby achieving the establishment of connections between different transmission nodes.

It should be understood that specific details of the process of establishing a connection by the second node may refer to the description of the first node in FIG. 2 described above, and for the sake of brevity, it will not be repeated here.

FIG. 4 is a schematic block diagram of a node device 400 according to an embodiment of the present application. The node device is a first node device. As shown in FIG. 4, the first node device 400 includes a determining unit 410 and a processing unit 420.

The determining unit 410 is configured to determine a second node device among at least one node device according to a preset condition, where the second node device is a node device with a highest level among the at least one node device, and a higher level of the node device means fewer hops between the node device and the anchor node.

The processing unit 420 is configured to establish a connection with the second node device determined by the determining unit 410.

Therefore, each transmission node selects a suitable node based on the levels of different nodes and requests to establish a connection, thereby achieving the establishment of a connection between different transmission nodes.

Optionally, the first node device further includes a measurement unit, where the measurement unit is configured to perform signal measurement; and the determining unit 410 is further configured to determine a node device whose measurement result is higher than a preset threshold as the at least one node device.

Optionally, the measurement result is a measurement result of a reference signal receiving power (RSRP), and/or a reference signal receiving quality (RSRQ).

Optionally, the preset threshold is a reference signal receiving power threshold in a cell selection or reselection process, and/or a reference signal receiving quality threshold in the cell selection or reselection process.

Optionally, the first node device further includes a receiving unit, configured to receive configuration information, where the configuration information is used to indicate the preset threshold.

Optionally, the first node device further includes an acquiring unit, configured to acquire the preset threshold pre-stored in the first node device.

Optionally, the processing unit 420 is specifically configured to: if the level of the second node does not reach the lowest level, establish a Uu interface-based connection between the first node and the second node, where the lowest level is the lowest level that can be represented by an information field for representing the level of each node device.

Optionally, the first node device further includes a sending unit, configured to broadcast a level of the first node device.

Optionally, if the level of the second node device does not reach the lowest level, the level of the first node device is lower than the level of the second node device, where the lowest level is the lowest level that can be represented by the information field for representing the level of each node device.

Optionally, if the level of the second node has reached the lowest level, the level of the first node is the highest level, where the lowest level is the lowest level that can be represented by the information field for representing the level of each node device, and the highest level is the highest level that can be represented by the information field.

Optionally, if the level of the second node device has reached the lowest level, the level of the second node device is updated to the highest level, and the level of the first node device is lower than the updated level of the second node device, where the lowest level is the lowest level that can be represented by an information field for representing the level of each node device, and the highest level is the highest level that can be represented by the information field.

Optionally, the processing unit 420 is specifically configured to establish a connection with the second node device through a Uu interface.

Optionally, if the level of the second node device has reached the lowest level, the level of the first node device is the lowest level, where the lowest level is the lowest level that can be represented by the information field for representing the level of each node device.

Optionally, the processing unit 420 is specifically configured to establish a connection with the second node device in a D2D manner.

Optionally, the processing unit 420 is further configured to establish a connection with other at least one node device of the same level as the first node in a D2D manner.

Optionally, the processing unit 420 is further configured to establish a connection based on a Uu interface with other at least one node device of the same level as the first node.

Optionally, the first node device further includes a receiving unit, configured to receive first configuration information sent by the second node, where the first configuration information is used to instruct the first node to establish a connection based on a Uu interface with at least one other transmission node that has the same level as the first node.

Optionally, the processing unit 420 is further configured to: disconnect an established connection with other node device.

Optionally, the processing unit 420 is further configured to establish a connection based on a Uu interface with at least one other transmission node having the same level as the second node.

Optionally, the first node device further includes a receiving unit, configured to receive second configuration information sent by the second node, where the second configuration information is used to instruct the first node to establish a connection based on a Uu interface with at least one other transmission node at the same level of the second node.

Optionally, the processing unit 420 is further configured to: make the first node device maintain an established connection with another node device.

Optionally, the first node device further includes a measurement unit, and if the at least one node device further includes N node devices of the same level as the second node device, the measurement unit is configured to perform signal measurement; and the determining unit 410 is specifically configured to determine the second node device among the N node devices according to a measurement result, where the second node device is a transmission node with the highest signal measurement result among the N node devices.

It should be understood that the first node device 400 may correspond to the first node in the method 200, and may implement operations implemented by the first node in the method 200. For brevity, details are not described herein again.

Figure 5:
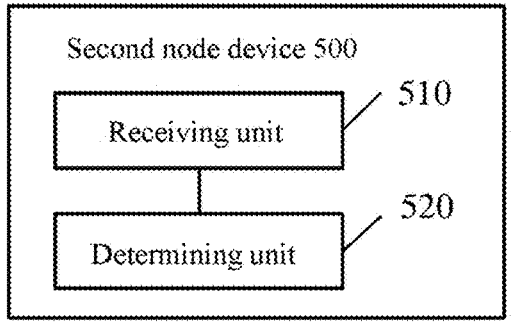
FIG. 5 is a schematic block diagram of a node device according to another embodiment of the present disclosure.

FIG. 5 is a schematic block diagram of a node device 500 according to an embodiment of the present application. The node device is a second node device. As shown in FIG. 5, the second node device 500 includes a receiving unit 510 and a determining unit 520.

The receiving unit 510 is configured to receive a connection establishment request message sent by a first node device.

The determining unit 520 is configured to determine whether to establish a connection with the first node device based on the level of the second node device according to the connection establishment request message, where a higher level of the node device indicates smaller number of hops between the node device and the anchor node device.

Therefore, each node determines whether to establish a connection with other nodes according to its own level, thereby achieving the establishment of connections between different transmission nodes.

Optionally, the determining unit 520 is specifically configured to: if the level of the second node device has reached the lowest level, determine to refuse to establish a Uu interface-based connection with the first node device, where the lowest level is the lowest level that can be represented by the information field for representing each node device.

Optionally, the determining unit 520 is specifically configured to: if the level of the second node device does not reach the lowest level, determine to establish a connection with the first node device, and the level of the first node device is lower than the level of the second node device, where the level of the first node device is lower than the level of the second node device, and the lowest level is the lowest level that can be represented by the information field for representing each node device.

Optionally, the determining unit 520 is specifically configured to: if the level of the second node device has reached the lowest level, update the level of the second node device to the highest level, and determine to establish a connection with the first node device, the level of the first node device being lower than the updated level of the second node device, where the lowest level is the lowest level that can be represented by the information field for representing each node device, and the highest level is the highest level that can be represented by the information field.

Optionally, the determining unit 520 is specifically configured to: if the level of the second node has reached the lowest level, determine, by the second node, to establish a connection with the first node, where the level of the first node is the highest level, and the lowest level is the lowest level that can be represented by an information field for representing the level of each node, and the highest level is the highest level that can be represented by the information field.

Optionally, the second node device further includes a processing unit, configured to establish a connection with the first node device through a Uu interface.

Optionally, the determining unit 520 is specifically configured to: if the level of the second node device has reached the lowest level, determine to establish a connection with the first node device in a device-to-device D2D manner, where the level of the first node device is the lowest level, and the lowest level is the lowest level that can be represented by an information field for representing the level of each node device.

Optionally, the second node device further includes a sending unit, configured to: broadcast a level of the second node device.

Optionally, the first node device further includes a sending unit, configured to: send first configuration information to the first node device, where the first configuration information is used to instruct the first node device to establish a connection based on a Uu interface with at least one other node device of the same level as the first node device.

Optionally, the first node device further includes a sending unit, configured to send second configuration information to the first node device, where the second configuration information is used to instruct the first node device to establish a connection based on the Uu interface with at least one other node device at the same level as the second node device.

It should be understood that the second node device 500 may correspond to the second node in the method 300, and may implement operations implemented by the second node in the method 300. For brevity, details are not described herein again.

Figure 6:
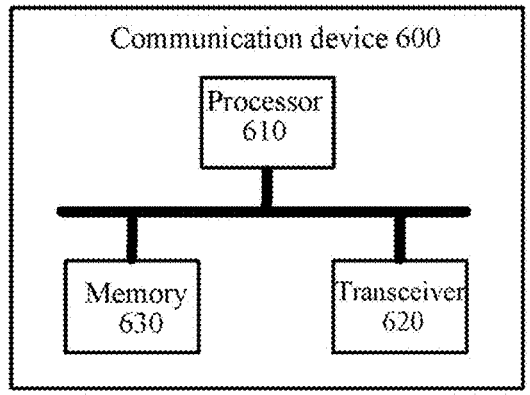
FIG. 6 is a schematic block diagram of a system chip according to an embodiment of the present disclosure.

FIG. 6 is a schematic structural diagram of a communication device 600 according to an embodiment of the present application. As shown in FIG. 6, the communication device includes a processor 610, a transceiver 620, and a memory 630, where the processor 610, the transceiver 620, and the memory 630 communicate with each other through an internal connection path. The memory 630 is configured to store instructions, and the processor 610 is configured to execute the instructions stored in the memory 630 to control the transceiver 620 to receive signals or send signals.

Optionally, the processor 610 may call the program code stored in the memory 630 to perform the corresponding operation of the method 200 performed by the first node in the method embodiment. For simplicity, details are not described herein again.

Optionally, the processor 610 may call the program code stored in the memory 630 to perform the corresponding operation of the method 300 performed by the second node in the method embodiment. For simplicity, details are not described herein again.

It should be understood that the processor in the embodiments of the present application may be an integrated circuit chip and has a signal processing capability. In the implementation process, each step of the foregoing method embodiment may be completed by using an integrated logic circuit of hardware or an instruction in a form of software in a processor. The above processor may be a general-purpose processor, a Digital Signal Processor (DSP), an Application Specific Integrated Circuit (ASIC), a Field Programmable Gate Array (FPGA), or other programmable logic devices, discrete gates or transistor logic devices, discrete hardware components. Various methods, steps, and logical block diagrams disclosed in the embodiments of the present application can be implemented or executed. The general-purpose processor may be a microprocessor or the processor may be any conventional processor or the like. The steps of the method disclosed in combination with the embodiments of the present application may be directly implemented by a hardware decoding processor, or may be performed by using a combination of hardware and software modules in the decoding processor. The software module may be located in a mature storage medium such as a random access memory, a flash memory, a read-only memory, a programmable read-only memory, or an electrically erasable programmable memory, a register, and the like. The storage medium is located in a memory, and the processor reads the information in the memory and completes the steps of the foregoing method in combination with its hardware.

It can be understood that the memory in the embodiments of the present application may be a volatile memory or a non-volatile memory, or may include both volatile and non-volatile memories. The non-volatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM), which is used as an external cache. By way of example, but not limitation, many forms of RAM are available, such as a Static Random Access Memory (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory of the systems and methods described herein is intended to include, but is not limited to, these and any other suitable types of memory.

Figure 7:
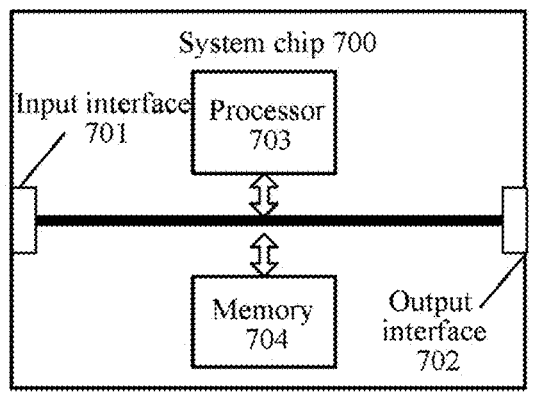
FIG. 7 is a schematic block diagram of a communication device according to an embodiment of the present disclosure.

FIG. 7 is a schematic structural diagram of a system chip according to an embodiment of the present application. The system chip 700 of FIG. 7 includes an input interface 701, an output interface 702, at least one processor 703, and a memory 704. The input interface 701, the output interface 702, the processor 703, and the memory 704 are connected to each other through an internal connection path. The processor 703 is configured to execute code in the memory 704.

Optionally, when the code is executed, the processor 703 may implement the method 200 executed by the first node in the method embodiment. For brevity, details are not repeated here.

Optionally, when the code is executed, the processor 703 may implement the method 300 executed by the second node in the method embodiment. For brevity, details are not repeated here.

It should be understood that in the embodiments of the present disclosure, "B corresponding to A" means that B is associated with A, and B can be determined according to A. However, it should also be understood that determining B based on A does not mean determining B based on A alone, B may also be determined based on A and/or other information.

It should also be understood that the term "and/or" herein is only an association relationship describing associated objects, and indicates that there can be three kinds of relationships, for example, A and/or B can indicate the following three cases: A exists alone, A and B exist at the same time, and B exists alone. In addition, the character "/" here generally indicates that the associated objects are an "or" relationship.

Those of ordinary skill in the art may realize that the units and algorithm steps of each example described in connection with the embodiments disclosed herein can be implemented by electronic hardware, or a combination of computer software and electronic hardware. Whether these functions are performed in hardware or software depends on the specific application and design constraints of the technical solution. Professional technicians can use different methods to implement the described functions for each specific application, but such implementation should not be considered to go beyond the scope of this application.

Those skilled in the art can clearly understand that, for the convenience and brevity of description, the specific working processes of the systems, devices, and units described above can refer to the corresponding processes in the foregoing method embodiments, and are not repeated here.

In the several embodiments provided in this application, it should be understood that the disclosed systems, devices, and methods may be implemented in other ways. For example, the device embodiments described above are only schematic. For example, the division of the unit is only a logical function division. In actual implementation, there may be other division manner. For example, a plurality of units or components may be combined or may be integrated into another system, or some features can be ignored or not implemented. In addition, the displayed or discussed mutual coupling or direct coupling or communication connection may be indirect coupling or communication connection through some interfaces, devices or units, which may be electrical, mechanical or other forms.

The units described as separate components may or may not be physically separated, and the components displayed as units may or may not be physical units, may be located in one place, or may be distributed on a plurality of network units. Some or all of the units may be selected according to actual needs to achieve the objective of the solution of this embodiment.

In addition, each functional unit in each embodiment of the present application may be integrated into one monitoring unit, or each unit may exist separately and physically, or two or more units may be integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, or the like) to perform all or a part of the steps of the embodiments of this application. The foregoing storage medium includes: any medium that can store program codes, such as a USB flash disk, a removable hard disk, a read-only memory (Read-Only Memory, ROM), a random access memory (Random Access Memory, RAM), a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for network self-organization, comprising:
determining, by a first node, a second node among at least one transmission node according to a preset condition, wherein the second node is a transmission node with a highest level among the at least one transmission node, and wherein a higher level of the transmission node indicates fewer hops between the transmission node and an anchor node; and
establishing, by the first node, a connection with the second node;
wherein the method further comprises:
receiving, by the first node, second configuration information sent by the second node, wherein the second configuration information is used to instruct the first node to establish a connection with at least one other transmission node that has the same level as the second node based on a Uu interface; and
establishing, by the first node, the connection with the at least one other transmission node that has the same level as the second node based on the Uu interface.

2. The method according to claim 1, wherein before determining, by the first node, the second node among the at least one transmission node according to the preset condition, the method further comprises:
performing, by the first node, a signal measurement, and determining a transmission node whose measurement result is higher than a preset threshold as the at least one transmission node.

3. The method according to claim 2, wherein the measurement result is a measurement result of a reference signal receiving power (RSRP), and/or a reference signal receiving quality (RSRQ).

4. The method according to claim 2, wherein the preset threshold is a reference signal receiving power threshold during a cell selection or reselection, and/or, a reference signal receiving quality threshold during the cell selection or reselection.

5. The method according to claim 2, wherein before determining, by the first node, the second node among the at least one transmission node according to the preset condition, the method further comprises:
receiving, by the first node, configuration information, wherein the configuration information is used to indicate the preset threshold.

6. The method according to claim 2, wherein before determining, by the first node, the second node among the at least one transmission node according to the preset condition, the method further comprises:
acquiring, by the first node, the preset threshold pre-stored in the first node.

7. The method according to claim 1, wherein the establishing, by the first node, the connection with the second node comprises:
when a level of the second node does not reach a lowest level, establishing, by the first node, a connection with the second node based on a Uu interface, wherein the lowest level is a lowest level that can be represented by an information field for representing the level of each node.

8. The method according to claim 1, further comprising:
broadcasting, by the first node, a level of the first node.

9. The method according to claim 8, wherein when a level of the second node does not reach a lowest level, the level of the first node is lower than the level of the second node,
wherein the lowest level is a lowest level that can be represented by an information field for representing the level of each node.

10. The method according to claim 9, wherein the establishing, by the first node, the connection with the second node comprises:
establishing, by the first node, the connection with the second node through a Uu interface.

11. The method according to claim 8, wherein when a level of the second node has reached a lowest level, the level of the second node is updated to a highest level, and the level of the first node is lower than the updated level of the second node, and
wherein the lowest level is a lowest level that can be represented by an information field for representing the level of each node, and the highest level is a highest level that can be represented by the information field.

12. The method according to claim 8, wherein when a level of the second node has reached a lowest level, the level of the first node is a highest level, and
wherein the lowest level is a lowest level that can be represented by an information field for representing the level of each node, and the highest level is a highest level that can be represented by the information field.

13. The method according to claim 8, wherein when a level of the second node has reached a lowest level, the level of the first node is the lowest level, and
wherein the lowest level is a lowest level that can be represented by an information field for representing the level of each node.

14. The method according to claim 1, further comprising:
establishing, by the first node, a connection with at least one other transmission node that has the same level as the first node based on a Uu interface.

15. The method according to claim 14, further comprising:
receiving, by the first node, first configuration information sent by the second node, wherein the first configuration information is used to instruct the first node to establish the connection with the at least one other transmission node that has the same level as the first node based on the Uu interface.

16. The method according to claim 1, wherein when the at least one transmission node further comprises N transmission nodes of the same level as the second node, the method further comprises:
performing, by the first node, a signal measurement, and determining the second node among the N transmission nodes according to a measurement result, wherein the second node is a transmission node with the highest signal measurement result among the N transmission nodes.

17. A node device, wherein the node device is a first node device, and the first node device comprises:
a processor;
a transceiver; and
a memory,
wherein the processor, the transceiver, and the memory communicate with each other through an internal connection path, the memory is configured to store instructions, and the processor is configured to execute the instructions stored in the memory, and when the processor executes the instructions stored in the memory, the execution causes the first node device to:

determine a second node device among at least one node device according to a preset condition, wherein the second node device is a node device with a highest level among the at least one node device, and wherein a higher level of the node device indicates fewer hops between the node device and an anchor node device; and establish a connection with the second node device;

wherein the execution further causes the first node device to:

receive second configuration information sent by the second node device, wherein the second configuration information is used to instruct the first node device to establish a connection with at least one other transmission node device that has the same level as the second node device based on a Uu interface; and establish the connection with the at least one other transmission node device that has the same level as the second node device based on the Uu interface.

18. A non-transitory computer-readable storage medium having stored therein instructions that, when executed by a processor of a node device, causes the node device to:

determine a second node device among at least one node device according to a preset condition, wherein the second node device is a node device with a highest level among the at least one node device, and wherein a higher level of the node device indicates fewer hops between the node device and an anchor node device; and establish a connection with the second node device;

receive second configuration information sent by the second node device, wherein the second configuration information is used to instruct the node device to establish a connection with at least one other transmission node device that has the same level as the second node device based on a Uu interface; and establish the connection with the at least one other transmission node device that has the same level as the second node device based on the Uu interface.

* * * * *